US012665410B2

(12) United States Patent
Habib et al.

(10) Patent No.: US 12,665,410 B2
(45) Date of Patent: Jun. 23, 2026

(54) SYSTEM AND METHOD FOR TRANSFER SWITCH UTILIZING RECLOSER OPERATIONS

(71) Applicant: ABB Schweiz AG, Baden (CH)

(72) Inventors: Hany Habib, Richmond, VA (US); Veerakumar Bose, Richmond, VA (US); Thomas Anthony Kendzia, III, Henrico, VA (US)

(73) Assignee: ABB SCHWEIZ AG, Baden (CH)

( * ) Notice: Subject to any disclaimer, the term of this patent is extended or adjusted under 35 U.S.C. 154(b) by 283 days.

(21) Appl. No.: 18/470,262

(22) Filed: Sep. 19, 2023

(65) Prior Publication Data

US 2025/0096551 A1     Mar. 20, 2025

(51) Int. Cl.
H02H 3/06          (2006.01)
H02H 1/00          (2006.01)
H02H 3/20          (2006.01)

(52) U.S. Cl.
CPC .......... H02H 3/066 (2013.01); H02H 1/0007 (2013.01); H02H 3/207 (2013.01)

(58) Field of Classification Search
CPC .............. G01R 19/16576; G05B 19/04; H02H 1/0007; H02H 3/066; H02H 3/207; H02J 2310/12; H02J 3/0012; H02J 3/007; H02J 3/0073; H02J 9/04; H02J 9/062; H02J 9/068; H02M 1/083; H02M 7/75; H03K 17/60; H03K 17/687
See application file for complete search history.

(56) References Cited

U.S. PATENT DOCUMENTS

| | | | | | |
|---|---|---|---|---|---|
| 5,808,378 | A * | 9/1998 | O'Leary | ................... | H02J 3/38 |
| | | | | | 307/127 |
| 8,860,251 | B2 * | 10/2014 | Lin | ......................... | H02J 9/061 |
| | | | | | 307/70 |
| 10,910,873 | B2 * | 2/2021 | Bonachea | ................. | H02J 9/06 |
| 11,489,333 | B2 * | 11/2022 | Song | .................... | H02H 1/0007 |
| 11,621,581 | B2 * | 4/2023 | Miloslavskiy | .......... | H02J 13/12 |
| | | | | | 307/64 |
| 2002/0130556 | A1 * | 9/2002 | Hohri | ...................... | H02J 9/061 |
| | | | | | 307/65 |

(Continued)

FOREIGN PATENT DOCUMENTS

WO       WO-2022125094 A1 *  6/2022   ......... H03K 17/0403

*Primary Examiner* — Monica Lewis
*Assistant Examiner* — Nicolas Bellido
(74) *Attorney, Agent, or Firm* — Greenberg Traurig, LLP

(57)        ABSTRACT

A method for performing recloser operations at a transfer switch includes obtaining an input from a first sensor measuring characteristics at an electrical conductor connecting a main power source to a load, comparing the input to one or more thresholds, cycling a first switch between an OFF and ON position for one or more cycles, determining the input exceeds the one or more thresholds when the first switch is cycled ON, and connecting the load to the main power source with the first switch in response to the input being within the one or more thresholds, or connecting the load to a second power source with a second switch in response to determining the input exceeds the one or more thresholds after the one or more cycles. The input may include a source voltage and the one or more thresholds may include an upper and lower voltage threshold.

12 Claims, 4 Drawing Sheets

(56)            References Cited

U.S. PATENT DOCUMENTS

2013/0106190 A1 *    5/2013   Lin ......................... H02J 9/061
                                                         307/64
2023/0184834 A1 *    6/2023   Srivastava ............. G01R 31/66
                                                         324/415
2023/0187963 A1 *    6/2023   Zhang ................... H02J 3/0073
                                                         307/64

* cited by examiner

SYSTEM AND METHOD FOR TRANSFER SWITCH UTILIZING RECLOSER OPERATIONS

FIELD

The present disclosure relates to the field of transfer switches. And, more particularly, to transfer switches utilizing recloser operations.

BACKGROUND

Reclosers are high-voltage electric circuit breaker devices connected to one or more phases of a power line and capable of opening to isolate an electric power source from an electrical load based on detecting power fluctuations on the power line which exceed a certain threshold. Typically, after the recloser has opened, the recloser can monitor the electrical current at the line connected to the power source to determine whether the fluctuations have stabilized below the certain threshold. After the recloser determines the power fluctuations have subsided and power has stabilized, the recloser can be reset to restore connection between the electrical power source and the load.

SUMMARY

When switching from a main electrical power source to a secondary electrical power source, or vice versa, the switching operations at a transfer switch can pose certain challenges which affect power quality for an electrical load connected to the transfer switch such as, for example, data center systems. When switching from one power source to the other power source in response to detecting an interruption or power fluctuation, switching to the other power source can draw a high inrush current which can exceed a rated system current. In a number of applications and systems, such high inrush currents can approach or exceed fault protection trip levels and may highly stress or damage a transformer or other components connected to the transformer (e.g., components of the electrical load).

Reclosers open in response to detecting power fluctuations at one of the phase power lines connecting an electrical power source to a load. Recloses can be configured to automatically reclose following the abnormal condition and once the power fluctuations are no longer detected. However, reclosers typically may only be capable of performing a limited number of automatic reclosing attempts before they are mechanically locked into the open position and have to be manually operated to be reconnected.

Additionally, conventional switching devices utilized in transfer switches can include therein various types of solid state switching devices. However, the conventional transfer switches are typically not capable of performing the one or more techniques as described herein corresponding to the recloser operations. Instead, the conventional switching devices are controlled using gating signals to switch from the main power source to the secondary power source in response to detecting power fluctuations or a loss of power at the main power source, or vice versa.

Conventional transfer switches may include therein silicon controlled rectifiers (SCRs) or SCRs with paralleled resonant turn-off (RTO) circuits connecting the electrical load to the main power source and the secondary power source. The SCRs are controlled using gating signals to transfer connection of the electrical load from the main power source to the secondary power source. However, the turn-off time of the primary source is greatly reduced with SCRs. Specifically, these switching devices can include long transfer times (e.g., >10 ms) due to being configured to wait until the next flux-matching point to minimize transformer inrush.

In some embodiments, a method includes obtaining, by a controller, an input from a first sensor measuring electrical characteristics at an electrical conductor connecting a main power source to a load using a transfer switch, comparing, by the controller, the input to one or more thresholds to determine an abnormal condition, cycling, by the controller, a first switch at the transfer switch between an OFF position and ON position for one or more cycles, determining, by the controller, whether the input from the first sensor exceeds the one or more thresholds when the first switch is in the ON position, and connecting, by the controller, the load to the main power source with the first switch in response to determining the input is within the one or more thresholds after the one or more cycles, or connecting the load to a second power source with a second switch in response to determining the input exceeds the one or more thresholds after the one or more cycles.

In some embodiments, the input includes a source voltage.

In some embodiments, the one or more thresholds includes an upper voltage threshold, a lower voltage threshold, and the load is connected to the main power source when the source voltage is less than the upper voltage threshold and greater than the lower voltage threshold, the load is connected to the second power source when the source voltage is greater than the upper voltage threshold or lower than the lower voltage threshold.

In some embodiments, cycling the first switch at the transfer switch between the OFF position and the ON position for the one or more cycles further includes cycling, by the controller for each cycle, the first switch to the OFF position for a first period of time, and cycling, by the controller for each cycle, the first switch to the ON position for a second period of time and measuring the input to determine whether the input exceeds the one or more thresholds.

In some embodiments, the first period of time and the second period of time each includes approximately 0.1 msec.

In some embodiments, connecting the load to the second power source further includes cycling, by the controller, the first switch to the OFF position to disconnect the load from the main power source, and cycling, by the controller, the second switch to the ON position to connect the load to the second power source.

In some embodiments, the first switch includes one or more first solid-state switching devices (SSSDs), the one or more first SSSDs is arranged in a reverse orientation to enable bi-directional flow of a phase current between the load and the main power source.

In some embodiments, the one or more first SSSDs includes at least one of SiC metal-oxide-semiconductor field-effect transistors (MOSFETs), insulated gate bipolar transistors (IGBTs), bipolar junction transistors (BJTs), and junction-gate field effect transistors (JFETs).

In some embodiments, the one or more first SSSDs includes SiC MOSFETs.

In some embodiments, the second switch includes one or more second SSSDs, the one or more second SSSDs is arranged in a reverse orientation to enable bi-directional flow of a phase current between the load and the second power source.

In some embodiments, the one or more second SSSDs includes at least one of SiC metal-oxide-semiconductor field-effect transistors (MOSFETs), insulated gate bipolar transistors (IGBTs), bipolar junction transistors (BJTs), junction-gate field effect transistors (JFETs), silicon controlled rectifiers (SCRs), and SCRs with paralleled resistive turn-off (RTO) circuits.

In some embodiments, the one or more second SSSDs includes SCRs with paralleled RTO circuits.

In some embodiments, a system includes a main power source, a second power source, a load, a transfer switch including a first switch located between the main power source and the load, and a second switch located between the second power source and the load, and a controller including a processor, and a non-transitory computer-readable medium having stored thereon instructions executable by the processor to control an operation of the transfer switch including obtain an input from a first sensor measuring electrical characteristics at an electrical conductor connecting the main power source to the load using the transfer switch, compare the input to one or more thresholds to determine an abnormal condition, cycle, for each cycle of one or more cycles, the first switch to an OFF position for a first period of time, cycle, for each cycle of the one or more cycles, the first switch to an ON position for a second period of time and measure the input to determine whether the input exceeds the one or more thresholds, determine whether the input from the first sensor exceeds the one or more thresholds when the first switch is in the ON position, and connecting, by the controller, the load to the main power source with the first switch in response to determining the input is within the one or more thresholds after the one or more cycles, or connecting the load to a second power source with a second switch in response to determining the input exceeds the one or more thresholds after the one or more cycles, and the first period of time and the second period of time each includes approximately 0.1 msec.

In some embodiments, the input includes a source voltage, and the one or more thresholds includes an upper voltage threshold, a lower voltage threshold. In some embodiments, the load is connected to the main power source when the source voltage is less than the upper voltage threshold and greater than the lower voltage threshold, and the load is connected to the second power source when the source voltage is greater than the upper voltage threshold or lower than the lower voltage threshold.

In some embodiments, connecting the load to the second power source further includes cycling, by the controller, the first switch to the OFF position to disconnect the load from the main power source, and cycling, by the controller, the second switch to the ON position to connect the load to the second power source.

In some embodiments, the first switch includes one or more first solid-state switching devices (SSSDs) including at least one of SiC metal-oxide-semiconductor field-effect transistors (MOSFETs), insulated gate bipolar transistors (IGBTs), bipolar junction transistors (BJTs), and junction-gate field effect transistors (JFETs), the one or more first SSSDs is arranged in a reverse orientation to enable bi-directional flow of a phase current between the load and the main power source.

In some embodiments, the one or more first SSSDs includes SiC MOSFETs.

In some embodiments, the second switch includes one or more second SSSDs including at least one of SiC metal-oxide-semiconductor field-effect transistors (MOSFETs), insulated gate bipolar transistors (IGBTs), bipolar junction transistors (BJTs), junction-gate field effect transistors (JFETs), silicon controlled rectifiers (SCRs), and SCRs with paralleled resistive turn-off (RTO) circuits, the one or more second SSSDs is arranged in a reverse orientation to enable bi-directional flow of a phase current between the load and the second power source.

In some embodiments, the one or more second SSSDs includes SCRs with paralleled RTO circuits.

In some embodiments, a transfer switch device including a first switch located between a main power source and a load and including one or more first solid-state switching devices (SSSDs), each first SSSD includes at least one of SiC metal-oxide-semiconductor field-effect transistors (MOSFETs), insulated gate bipolar transistors (IGBTs), bipolar junction transistors (BJTs), and junction-gate field effect transistors (JFETs), a second switch located between a second power source and the load and including one or more second SSSDs, each second SSSD includes at least one of SiC metal-oxide-semiconductor field-effect transistors (MOSFETs), insulated gate bipolar transistors (IGBTs), bipolar junction transistors (BJTs), junction-gate field effect transistors (JFETs), silicon controlled rectifiers (SCRs), and SCRs with paralleled resistive turn-off (RTO) circuits, and a controller including a processor and a non-transitory computer-readable medium having stored thereon instructions executable by the processor to perform operations including obtain a source voltage from a first sensor measuring electrical characteristics at an electrical conductor connecting the main power source to the load using the transfer switch, compare the source voltage to an upper voltage threshold and a lower voltage threshold to determine an abnormal condition, cycle, for each cycle of one or more cycles, the first switch to an OFF position for a first period of time, cycle, for each cycle of the one or more cycles, the first switch to an ON position for a second period of time and measure the source voltage to determine whether the source voltage exceeds the upper voltage threshold and the lower voltage threshold, determine whether the source voltage from the first sensor exceeds the upper voltage threshold or the lower voltage threshold when the first switch is in the ON position, and connecting, by the controller, the load to the main power source with the first switch in response to determining the source voltage is less than the upper voltage threshold and greater than the lower voltage threshold after the one or more cycles, or connecting the load to a second power source with a second switch in response to determining the source voltage is greater than the upper voltage threshold or less than the lower voltage threshold after the one or more cycles, the first period of time and the second period of time each includes approximately 0.1 msec.

BRIEF DESCRIPTION OF THE DRAWINGS

Some embodiments of the disclosure are herein described, by way of example only, with reference to the accompanying drawings. With specific reference now to the drawings in detail, it is stressed that the embodiments shown are by way of example and for purposes of illustrative discussion of embodiments of the disclosure. In this regard, the description taken with the drawings makes apparent to those skilled in the art how embodiments of the disclosure may be practiced.

DETAILED DESCRIPTION

Among those benefits and improvements that have been disclosed, other objects and advantages of this disclosure will become apparent from the following description taken in conjunction with the accompanying figures. Detailed embodiments of the present disclosure are disclosed herein; however, it is to be understood that the disclosed embodiments are merely illustrative of the disclosure that may be embodied in various forms. In addition, each of the examples given regarding the various embodiments of the disclosure which are intended to be illustrative, and not restrictive.

Various embodiments of the present disclosure relate to systems, devices, and methods for performing reclosing operations utilizing a transfer switch including a main switch including one or more solid state switching devices (SSSDs) therein that are capable of high frequency switching operations in order to protect against power quality issues from a main power source and to provide added protection to the electrical load by keeping the main power source connected to the electrical load and reducing a likelihood of performing switching operations to an alternate power source due to power fluctuations at the main power source. In this regard, the present embodiments include any appropriate combination of hardware components and computer readable software in accordance with the present disclosure capable of performing the recloser operations at the transfer switch as will be described herein.

The various embodiments described herein may include transfer switches and/or systems including the transfer switch that may be capable of performing the one or more techniques described herein to provide a backup protection scheme for the transfer switches. The reclosing operations at the transfer switch may reduce a frequency of switching from the main power source to the secondary power source, thereby reducing excessive wear on the transfer switch components. Accordingly, the transfer switch may also reduce a likelihood that downstream inrush current may be produced during the switching operations from the main power source to the secondary power source, thereby avoiding the saturation region of the transformer and reducing a likelihood of causing damage to the transformer or the electrical load at the secondary side of the transformer. Additionally, the transfer switch as described herein may be capable of performing recloser operations to provide enhanced electrical protection capabilities to enable the transfer switch to be manufactured using other types of switching devices (e.g., SCRs) having a lower manufacturing cost installed between the secondary power source and the electrical load, rather than requiring higher costing SSSDs (e.g., SiC MOSFETs) which are capable of faster switching frequencies to reduce inrush current during the switching operation.

Figure 1:
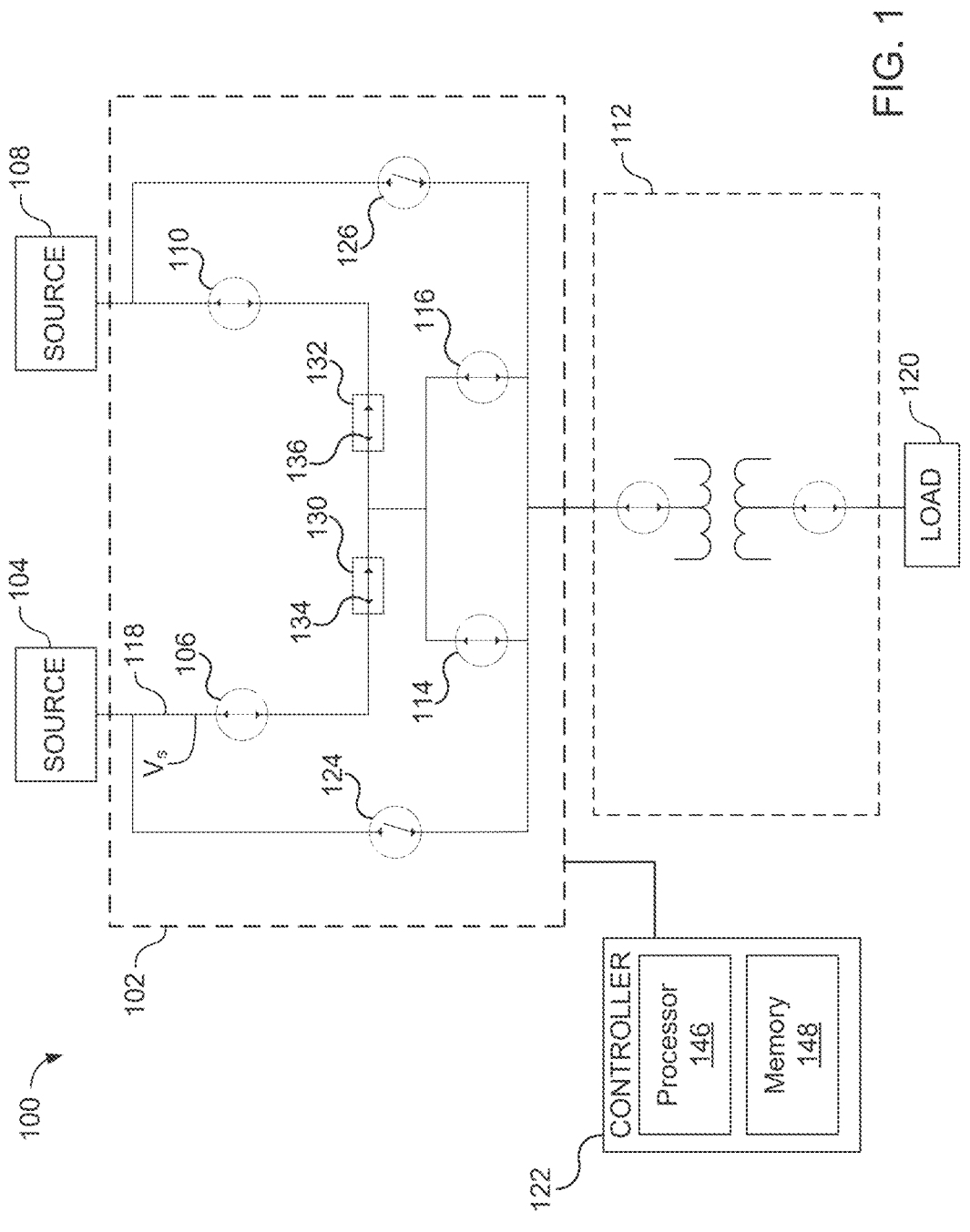
FIG. 1 illustrates a schematic diagram of a system, according to some embodiments.

FIG. 1 illustrates a schematic diagram of a system 100, according to some embodiments.

The system 100 includes a transfer switch 102 which is conductively coupled to a first electrical power source 104, hereinafter referred to as main source 104, via a first mechanical circuit breaker (MCB) 106, and a second electrical power source 108, hereinafter referred to as secondary source 108, which is conductively coupled with the transfer switch 102 via a second MCB 110. The system 100 may include a transformer 112 including a primary side which is conductively coupled with the transfer switch 102 via a third MCB 114 and a fourth MCB 116, and a secondary side which is conductively coupled with a load 120, according to some embodiments.

The main source 104 and the secondary source 108 may be a number of forms and types of electrical power sources, for example, a utility grid, a microgrid, a nanogrid, a backup generator, an uninterruptable power supply (UPS) or backup battery, a flywheel operatively coupled with a motor/generator, a PV array, a wind farm, a fuel cell installation, or any of a number of other sources of electrical power as will occur to one of skill in the art with the benefit of the present disclosure. One of the main source 104 and the secondary source 108 may be a primary or preferred power source for the system 100 and the other of the main source 104 and the secondary source 108 may be a secondary or backup power source for the system 100. In some embodiments, the main source 104 may be a utility grid serving as a primary power source and the secondary source 108 may be one or more UPS serving as a backup power source. In some embodiments, the transfer switch 102 may also be considered and referred to as a bypass switch or a UPS bypass switch. The load 120 may be any of a variety of types of load systems, for example, a datacenter, educational facility, governmental facility, hospital or other healthcare facility, manufacturing, chemical or other industrial plant, water treatment plant, or other types of loads or load systems as will occur to one of skill in the art with the benefit of the present disclosure.

The MCB 106, 110, 114, 116 are configured and operable to provide fault protection by transitioning from a closed-circuit state to an open-circuit state in response to a fault condition, such as an over-current condition, an over-voltage condition, and/or another fault condition. Furthermore, the MCB 106, 110, 114, 116 may be configured and operable to provide passive fault protection, active fault protection, or other active opening or closing operation (e.g., in response to control signals received from the electronic control system (ECS) 122), or both. It shall be appreciated that certain embodiments may omit one or more of the MCB 106, 110, 114, 116. Furthermore, certain embodiments may comprise additional or alternate fault protection devices as will occur to one of skill in the art with the benefit of the present disclosure.

The system 100 may also include a fifth MCB 124, which may be conductively coupled between the main source 104 and the transformer 112, and a sixth MCB 126, which may be conductively coupled between the secondary source 108 and the transformer 112, according to some embodiments. The MCB 124, 126 are configured to selectably provide a closed circuit connection between the main source 104 and the secondary source 108, respectively, bypassing the transfer switch 102 and may be actively controlled by the ECS 122, hereinafter referred to as controller 122. It shall be appreciated that certain embodiments may omit one or both of the MCB 124, 126. Furthermore, certain embodiments may include additional or alternate bypass devices as will occur to one of skill in the art with the benefit of the present disclosure.

The controller 122 may include a processor 146 and a memory 148. The memory 148 may be a non-transitory computer-readable medium having stored thereon instructions executable by the processor 146 to perform operations in accordance with the present disclosure. The controller 122 may include one or more other components, including components capable of placing the controller 122 in electrically communicable connection with the transfer switch 102 and to monitor and control the operation of the transfer switch 102 based on one or more parameters measured at the transfer switch 102 such as, for example, by one or more sensors (not shown). In some embodiments, the controller 122 may be operatively coupled with the transfer switch 102. Additionally, in some embodiments, the controller 122 may in some forms also be operatively coupled with one or more of the MCB 106, 110, 114, 116, 124, 126 and may monitor and/or actively control one or more of the MCB 106, 110, 114, 116, 124, 126.

The controller 122 may be provided as a portion or component of the transfer switch 102 (e.g., provided in a common housing or as a common unit), as one or more separate components, or distributed among one or more components forming a portion of the transfer switch 102 and one or more separate components. The controller 122 may include one or more integrated circuit-based (e.g., microprocessor-based, microcontroller-based, ASIC-based, FPGA-based, and/or DSP-based) control units as well as related driver, input/output, signal conditioning, signal conversion, non-transitory machine-readable memory devices storing executable instructions, and other circuitry.

The transfer switch 102 may be a static transfer switch including a first switch 130 at a first leg connecting the main source 104 to the load 120 and a second switch 132 at a second leg connecting the secondary source 108 to the load 120. Each of the first switch 130 and second switch 132 can be controlled to energize (or deenergize) the transformer 112 by conductively coupling (or decoupling) the transformer 112 with the main source 104 or the secondary source 108, respectively.

The first switch 130 may include therein a solid-state switching device (SSSD) 134 to cycle on/off in response to gating control signals to connect/disconnect the load from the main power source 104. According to some embodiments, the first switch 130 may include one or more SSSDs 134. The second switch 132 may include therein a solid-state switching device (SSSD) 136 to cycle on/off in response to gating control signals to connect/disconnect the load from the second power source. The second switch 132 may include therein one or more SSSDs 136. The one or more SSSDs 134 and one or more SSSDs 136 may be arranged in the first switch 130 or the second switch 132, respectively, in a reverse orientation to enable a bi-directional flow of phase current. Additionally, the one or more SSSDs 134 of the first switch 130 may be operable to perform a reclosing operation in response to detecting power fluctuations at the main source 104, as will be further described herein. In some embodiments, the controller 122 may control an operation of the first switch 130 via one or more gating pulse signals to cycle on/off to connect/disconnect to the load 120 and to perform the recloser operations. In some embodiments, the one or more SSSDs 136 of the second switch 132 may also be capable of performing the reclosing operations in response to detecting power fluctuations at the secondary source 108, in accordance with the present disclosure.

The transfer switch 102 includes first switch 130, which conductively couples the main source 104 with the transformer 112 (provided that the MCB 106, 114 are in a closed state) in response to the controller 122 cycling the first switch 130 to a closed state, and which conductively decouples the main source 104 with the transformer 112 in response to the controller 122 cycling the first switch 130 to an open state. The transfer switch 102 also includes second switch 132, which conductively couples the secondary source 108 with the transformer 112 (provided that the MCB 110, 116 are in a closed state) in response to the controller 122 cycling the second switch 132 to a close state, and which conductively decouples the secondary source 108 with the transformer 112 in response to the controller 122 cycling the second switch 132 to the open state.

The first switch 130 includes therein one or more SSSDs 134 capable of fast switching frequencies for performing the recloser operations as described herein, and which do not require waiting until the next flux-matching point to cycle on for reclosing purposes. In some embodiments, the one or more SSSDs 134 may be capable of switching frequencies of approximately 10 msec. In other embodiments, the one or more SSSDs 134 may be capable of switching frequencies of less than 10 msec. In yet other embodiments, the one or more SSSDs 134 may be capable of switching frequencies of approximately 0.1 msec. In some embodiments, the one or more SSSDs 134 may be capable of switching frequencies of less than 0.1 msec. For example, the one or more SSSDs 134 may by cycled on for less than 0.1 msec and, if the power source is still unavailable, cycling off again in less than 0.1 msec.

The one or more SSSDs 134 of first switch 130 may include SiC metal-oxide-semiconductor field-effect transistors (MOSFETs), insulated gate bipolar transistors (IGBTs), bipolar junction transistors (BJTs), junction-gate field effect transistors (JFETs), or any combinations thereof. In some embodiments, the first switch 130 may include one or more SiC MOSFETs. In other embodiments, the first switch 130 may include IGBTs. In yet other embodiments, the first switch 130 may include BJTs. In other embodiments, the first switch 130 may include JFETs.

The second switch 132 includes therein one or more SSSDs 136 capable of switching frequencies of approximately 10 msec. In this regard, the second switch 132 and the one or more SSSDs 136 may operate at a switching frequency such that the one or more SSSDs 136 waits until the next flux-matching point to cycle on. In some embodiments, the one or more SSSDs 136 may also be capable of switching frequencies for performing the recloser operations as described herein, and which may not require waiting until the next flux-matching point to cycle on for reclosing purposes.

The one or more SSSDs 136 of the second switch 132 may include silicon-controlled rectifiers (SCRs), SCRs with paralleled resonant turn-off (RTO) circuit 144, or combinations thereof. In some embodiments, the one or more SSSDs 136 may include SCRs. In other embodiments, the one or more SSSDs 136 may include SCRs with the paralleled RTO circuit 144. In some embodiments, the one or more SSSDs 136 may also include SiC metal-oxide-semiconductor field-effect transistors (MOSFETs), insulated gate bipolar transistors (IGBTs), bipolar junction transistors (BJTs), junction-gate field effect transistors (JFETs), or any combinations thereof.

It shall be appreciated that system 100 may be provided in a single-phase form, a three-phase form, or other multi-phase forms. In such multi-phase forms, the main source 104 and the secondary source 108 may be multi-phase power sources (e.g., three-phase power sources). In such forms, the MCB 106, 110, 114, 116, 124, 126, the transfer switch 102 and its constituent first switch 130 and second switch 132 may be provided in corresponding multi-phase forms and arrangements (e.g., three-phase forms and arrangements) wherein an additional instance of these components may be provided to service each additional phase. Furthermore, while system 100 is illustrated as comprising a main source 104 and a secondary source 108, it shall be appreciated that additional sources may also be present in certain embodiments and that such additional sources may include additional respective MCB components for fault protection and bypass operation and additional respective constituent first switch 130 and/or second switch 132 of the transfer switch 102.

The controller 122 may operate the components of the transfer switch 102 to coordinate the recloser operations during abnormal condition upstream of the transfer switch 102. For example, the controller 122 may detect fluctuations in the input phase voltage due to a ground short between the power source and the transfer switch 102. In this regard, in instances where there is an abnormal condition downstream causing fluctuations measured by the one or more sensors, the controller 122 may control the respective switch, e.g., first switch 130 or second switch 132, to cycle on/off. For example, in some embodiments, the controller 122 may include a first current sensor located between the main source 104 and the first switch 130 and a second current sensor located between the first switch 130 and the transformer 112, and the controller 122 may determine a fault is occurring from a downstream source by comparing the obtained measurements from the first current sensor and the second current sensor. Additionally, the controller 122 may control the MCB 106, 110, 114, 116, 124, 126 to perform one or more other operations associated with connecting the main source 104 or the secondary source 108 to the transformer 112 and the load 120. For example, in some embodiments, the controller 122 may cause the MCB 106 and the MCB 114 to trip open and to close MCB 124 to bypass the first switch 130.

Figure 2:
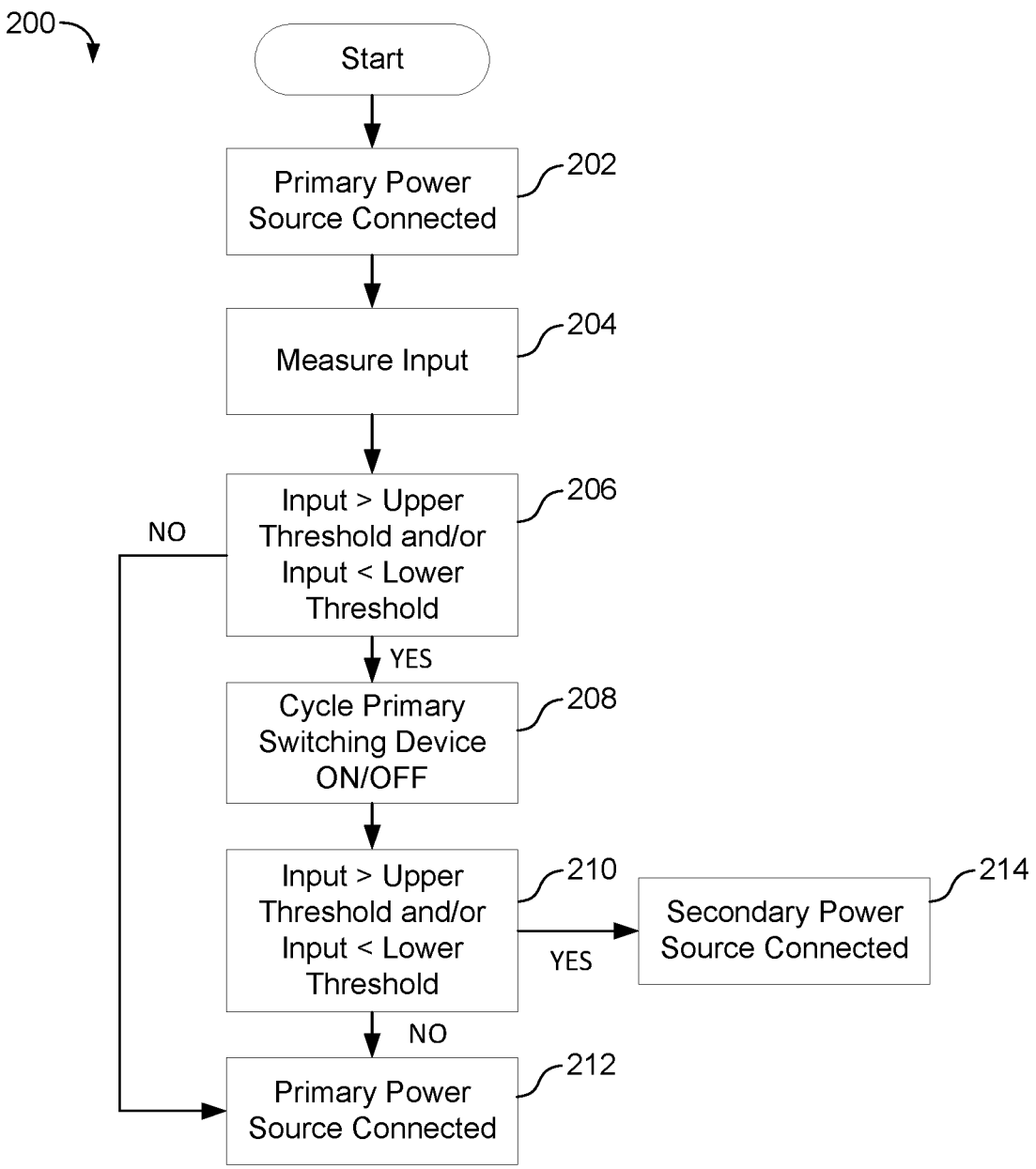
FIG. 2 illustrates a flow diagram of a method, according to some embodiments.

FIG. 2 illustrates a flow diagram of a method 200, according to some embodiments.

At 202, the method 200 may include determining a main source 104 is connected to the transfer switch 102. The controller 122 may determine the main source 104 is connected to the transfer switch 102 based on obtaining an input from one or more sensors in connection with the transfer switch 102 (e.g., controller 122) and indicative of one or more operational parameters of the main source 104. In some embodiments, the parameters may include a source voltage $V_S$. In other embodiments, the parameters may include a frequency. It is to be appreciated by those having skill in the art that the electrical parameters detected by the one or more sensors is not intended to be limiting and may a plurality of parameters in accordance with the present disclosure.

In some embodiments, the main source 104 may include therein a controller in communicable connection with controller 122, the controller 122 obtaining one or more electrical signals from the controller of the main source 104 corresponding to the main source 104 supplying power to the transfer switch 102.

The one or more sensors (not shown) on the transfer switch 102 may measure one or more characteristics or parameters including, but not limited to, current, resistance, voltage, impedance, frequency, other characteristics, or any combinations thereof. The controller 122 may obtain the measurements from the one or more sensors to determine one or more operating parameters in accordance with the present disclosure. In some embodiments, the one or more sensors may measure the source voltage $V_S$ of the main source 104, the secondary source 108, or both. In some embodiments, the controller 122 may obtain the source voltage $V_S$ of the main source 104 from the one or more sensors. In other embodiments, the controller 122 may obtain the source voltage $V_S$ of the second power source 108.

At 204, the method 200 includes obtaining the input from the one or more sensors. In some embodiments, the input may correspond to the source voltage $V_S$ from the main source 104 at transfer switch 102. The transfer switch 102 includes a first switch 130 connecting a load 120 to the main source 104 and a second switch 132 operable to connect the load 120 to a secondary source 108. The transfer switch 102 may be connected to a primary side of the transformer 112 and the load 120 may be connected to a secondary side of the transformer 112, according to some embodiments.

At 206, the method 200 includes comparing the input to an upper threshold or comparing the input to a lower threshold to determine fluctuation in the input. In some embodiments, the input may include a source voltage $V_S$, which is then compared to an upper threshold voltage $V_{TH1}$ and a lower threshold voltage $V_{TH2}$.

The source voltage $V_S$ is compared to the threshold voltages to determine fluctuations in the source voltage $V_S$. Fluctuations in the source voltage $V_S$ may be indicative of instability at the main source 104. The voltage fluctuations may be caused by a plurality of reasons such as, for example, an electrical short in the electrical conductor 118 connecting the main source 104 to the transfer switch 102 and which causes the source voltage $V_S$ to exceed one of the threshold voltages.

At 208, if the input exceeds one of the thresholds (e.g., upper threshold or lower threshold), the method 200 includes cycling the first switch 130 between an off position and an on position for one or more cycles.

At 210, during the cycling of the first switch 130, the input is monitored by the one or more sensors to determine whether the abnormal condition is present. In some embodiments, monitoring the input includes monitoring the source voltage $V_S$ when the first switch 130 is cycled on to determine whether the abnormal condition is present. In other embodiments, monitoring the input includes monitoring the frequency when the first switch 130 is cycled on to determine whether the abnormal condition is present between the main source 104 and the transfer switch 102.

To trigger the cycling of the first switch 130, the controller 122 may send one or more first gating signals to the first switch 130, and the one or more SSSDs 134 therein. In some embodiments, each cycle may include sending gating signals to turn the first switch 130 off for a first period of time to disconnect the main source 104 from the load 120 and turning the first switch 130 on for a second period of time to connect the main source 104 to the load 120. Additionally, during the cycling of the first switch 130, the inputs from the one or more sensors may continuously be monitored to determine whether the abnormal condition is still present or whether the abnormal condition has stabilized back to within the thresholds. In some embodiments, continuing to monitor the abnormal condition includes measuring the source voltage $V_S$ from the main source 104 during the second period of time to determine whether the source voltage $V_S$ is less than the threshold voltage $V_{TH}$ indicative of fluctuations at the main source 104. If after each second period of time the measured source voltage $V_S$ is less than the threshold voltage $V_{TH}$, the first switch 130 may be cycled off for the first period of time and cycled on again for the one or more cycles.

The first period of time may be approximately 0.1 msec. In some embodiments, the first period of time may be 0.1 msec. In other embodiments, the first period of time may be less than 0.1 msec. Additionally, the second period of time may be approximately 0.1 msec. In some embodiments, the second period of time may be 0.1 msec. In other embodiments, the second period of time may be less than 0.1 msec.

At 212, if at the end of the cycling of the first switch 130 the input measured by the one or more sensors is less than the upper threshold and greater than the lower threshold (e.g., within the upper and lower thresholds), the main source 104 remains connected to the load 120 and normal operation is resumed. In some embodiments, if the source voltage $V_S$ of the main source 104 is less than the upper threshold voltage $V_{TH1}$ and greater than the lower threshold voltage $V_{TH2}$, the first switch 130 remains cycled on and the main source 104 remains connected to the transformer 112 and the load 120.

At 214, if after the one or more cycles of the first switch 130 the input measured by the one or more sensors is greater than the upper threshold or lower than the lower threshold, the first switch 130 may be disconnected from the load 120 and the second switch 132 may be cycled on to connect the load 120 to the secondary source 108. In some embodiments, the first switch 130 may be cycled on/off for one or more cycles and the input may be monitored during each cycling such as to determine whether the input is less than the upper threshold and greater than the lower threshold. In some embodiments, if the source voltage $V_S$ of the main source 104 is greater than the upper threshold voltage $V_{TH1}$ or less than the lower threshold voltage $V_{TH2}$, the first switch 130 is cycled off and the secondary source 108 may be connected to the transformer 112 and the load 120. In some embodiments, during the second period of time, if the input is measured as being below than the upper threshold and greater than the lower threshold, the first switch 130 may be cycled on to maintain the load 120 connected to the main source 104. Additionally, in some embodiments, during the second period of time, the input is greater than the upper threshold or less than the lower threshold, the method 200 may cycle off the first switch 130 to disconnect the load 120 from the main source 104 and connect the load 120 to the secondary source 108.

In some embodiments, the first switch 130 may cycle on/off for a plurality of cycles. In yet other embodiments, the first switch 130 may cycle on/off for a certain defined number of cycles. The number of cycles the first switch 130 may be cycled on/off may be defined based on the time it takes for the first switch 130 to cycle between the on position and the off position. In some embodiments, the number of cycles the first switch 130 may also be defined based on a threshold period of time the load 120 may be connected to a fluctuating power source such as, for example, based on a design parameter of the system 100.

In some embodiments, connecting the load 120 to the secondary source 108 may include cycling the first switch 130 to the OFF position to disconnect the load from the main power source, and cycling the second switch 132 to the ON position to connect the load to the second power source 108. In some embodiments, the controller 122 may send the first set of gating signals to cycle on/off the first switch 130 for the one or more cycles and the second set of gating signals to connect the load 120 to secondary source 108 after the certain number of recloser attempt cycles. For example, the controller 122 may control the transfer switch 102 to cycle the first switch 130 on/off five times and to cycle on second switch 132 to connect the load 120 to the secondary source 108 after the source voltage VS remains below the voltage threshold $V_{TH}$ after five recloser attempts on the first switch 130.

Figure 3:
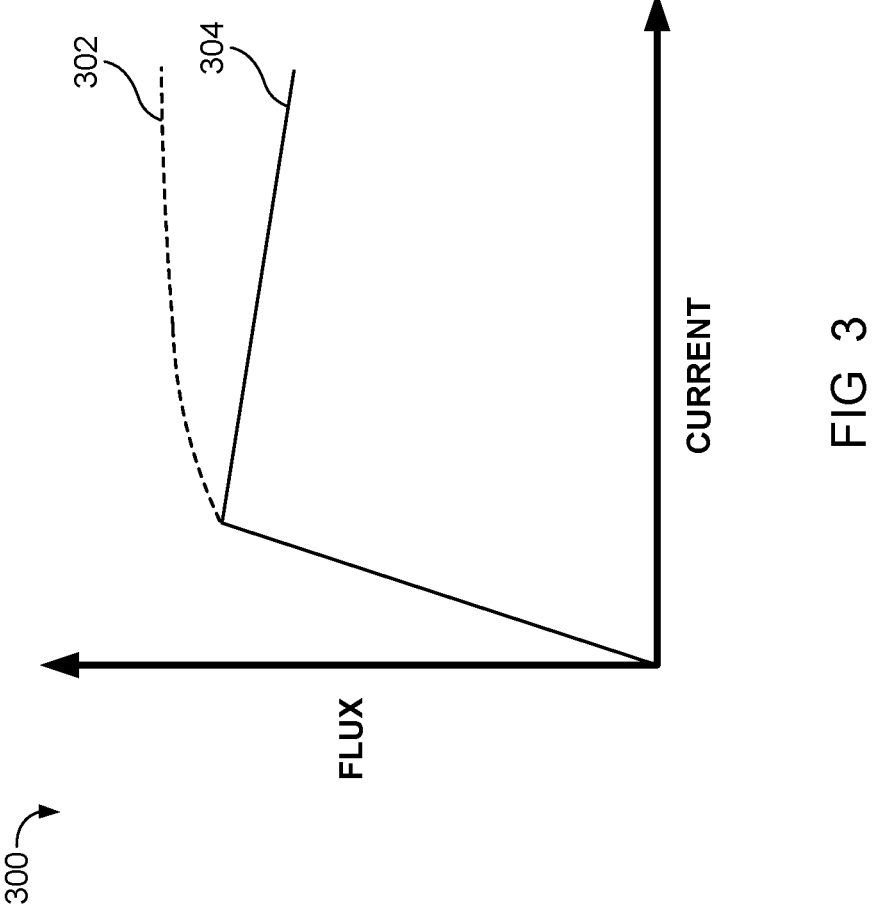
FIG. 3 illustrates a graph representation showing aspects of an example process of the system, according to some embodiments.

FIG. 3 illustrates a graph representative 300 showing aspects of an example process of the system 100, according to some embodiments.

The graph representative 300 includes a first graph 302 representative of the inrush current that may be produced from the transformer 112 during a switching operation at the transfer switch 102, where the load 120 and the transformer 112 is disconnected from the main source 104 by cycling off the first switch 130 and connected to the secondary source 108 by cycling on second switch 132 without the recloser operations as described herein. As shown in FIG. 3, the inrush current continues to gradually increase during the switching operation when the load 120 and the transformer 112 is disconnected from the main source 104 by cycling off the first switch 130 and connecting the load 120 and the transformer 112 to the secondary source 108 by cycling on the second switch 132.

The graph representative 300 also includes a second graph 304 representative of the inrush current that may be produced from the transformer 112 during the switching operation with the recloser operations as described herein. As shown in FIG. 3, the inrush current decreases during the switching operations as described herein including performing the recloser operations, where the first switch 130 is cycled on and off for one or more cycles in response to the source voltage $V_S$ falling below the threshold voltage $V_{TH}$. Additionally, cycling on/off the first switch 130 for the one or more cycles may be applied to reduce the inrush current from the transformer 112 to enable smoother switching operations when connecting the load 120 and the transformer 112 from the main source 104 to the secondary source 108.

Figure 4:
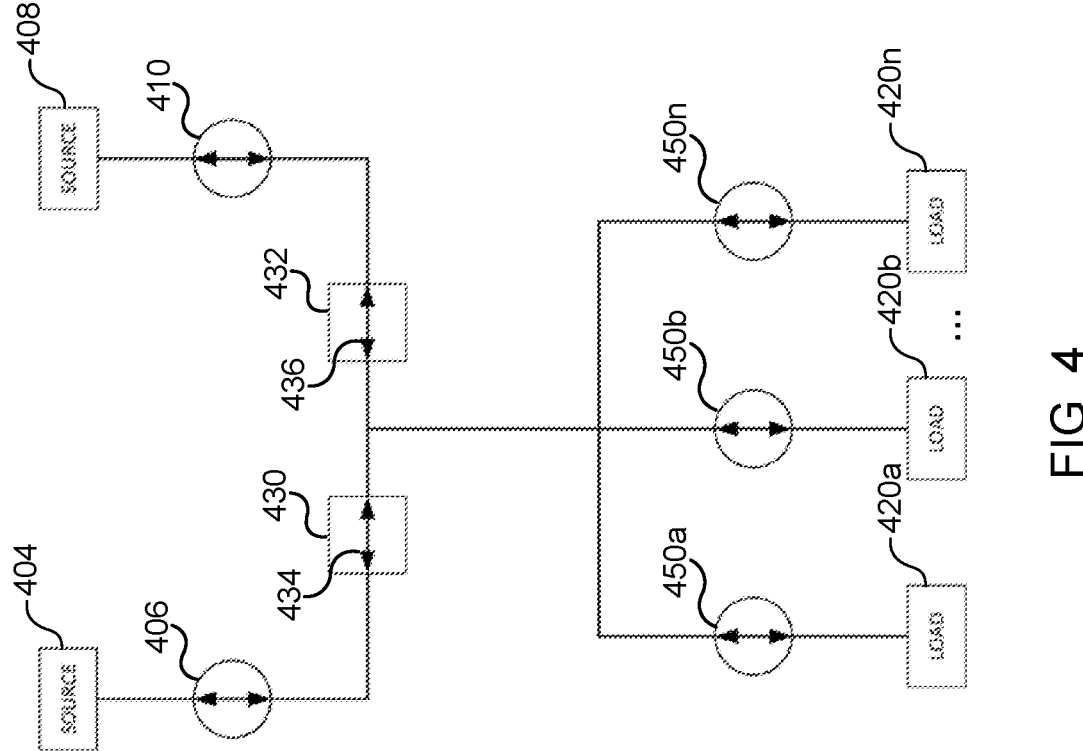
FIG. 4 is a schematic diagram illustrating a non-limiting example of a transfer switch, according to some embodiments.
Figure 4:

FIG. 4 is a schematic diagram illustrating a non-limiting example of a transfer switch 400, according to some embodiments.

The transfer switch 400 includes a switch 430 conductively coupled to a first electrical power source 404, hereinafter referred to as main source 404, via a mechanical circuit breaker (MCB) 406, and a switch 432 conductive coupled to a second electrical power source 408, hereinafter referred to as secondary source 408, via a MCB 410. The transfer switch 400 selectively operates the switch 430 and switch 432 to couple the load 420a, load 420b, through load 420n, which may hereinafter be referred to as loads 420, to the main source 404 and/or the secondary source 408. The switch 430 and switch 432 may include one or more fast switching SSSDs such as, for example, SSSDs 134 and SSSDs 136 in FIG. 1, respectively.

Similar to the transfer switch 102 in FIG. 1, the main source 404 and the secondary source 408 may be a number of forms and types of electrical power sources, for example, a utility grid, a microgrid, a nanogrid, a backup generator, an uninterruptable power supply (UPS) or backup battery, a flywheel operatively coupled with a motor/generator, a PV array, a wind farm, a fuel cell installation, or any of a number of other sources of electrical power as will occur to one of skill in the art with the benefit of the present disclosure. One of the main source 404 and the secondary source 408 may be a primary or preferred power source for the loads 420, and the other of the main source 404 and the secondary source 408 may be a secondary or backup power source for the loads 420. In some embodiments, the main source 404 may be a utility grid serving as a primary power source and the secondary source 408 may be one or more UPS serving as a backup power source. In some embodiments, the transfer switch 400 may also be considered and referred to as a bypass switch or a UPS bypass switch. The load 420 may be any of a variety of types of load systems, for example, a datacenter, educational facility, governmental facility, hospital or other healthcare facility, manufacturing, chemical or other industrial plant, water treatment plant, or other types of loads or load systems as will occur to one of skill in the art with the benefit of the present disclosure.

According to some embodiments, transfer switch 400 may include one or more other components similar to the transfer switch 102 (shown in FIG. 1) to enable the loads 420 to be selectively electrically coupled to the main source 404 and the secondary source 408 in response to abnormal conditions being detected at the main source 404 and/or the secondary source 408. For example, the transfer switch 400 may include one or more sensors to detect one or more characteristics including, but not limited to, input from main source 404, input from secondary source 408, an output, other parameters, or any combinations thereof.

The MCB 406, 410 may be configured and operable to provide fault protection by transitioning from a closed-circuit state to an open-circuit state in response to a fault condition such as where the recloser operations fail at the switch 430 and/or the switch 432, such as during an over-current condition, an over-voltage condition, and/or another fault condition. Furthermore, the MCB 406, 410, may be configured and operable to provide passive fault protection, active fault protection, or other active opening or closing operation (e.g., in response to control signals received from the ECS), or both. It shall be appreciated that certain embodiments may omit one or more of the MCB 406, 410. Furthermore, certain embodiments may comprise additional or alternate fault protection devices as will occur to one of skill in the art with the benefit of the present disclosure.

Connected between the switch 430 and the switch 432 and the loads 420 includes MCB 450a, MCB 450b, through MCB 450n, and which may hereinafter be referred to as MCBs 450. According to some embodiments, without the one or more reclosing techniques described herein, the switch 430 (and the SSSDs therein) may demonstrate poor coordination with the downstream breakers. As a result, a fault at one of the loads 420 can cause the switch 430 to trip before the corresponding one of the MCBs 450. For example, in response to a fault at load 420a, the switch 432 may trip open before MCB 450a. As such, the switch 432 tripping open disconnects each of the loads 420a, 420b, through 420n from the main source 404. In some embodiments, the transfer switch 400 may be in electrical connection with a controller, such as controller 112 of FIG. 1, which performs the reclosing techniques described herein, which includes using the recloser operations to control the cycling of the SSSDs in switch 430 during the fault at one of the loads 420 to allow the respective one of the downstream MCBs 450 (e.g., MCB 450a, MCB 450b, through MCB 450n) to trip before the SSSDs in switch 430 to maintain the other loads 420 connected to the main source 404. For example, in response to a fault condition at load 420a, the switch 430 may cycle on/off for one or more cycles to enable MCB 450a to trip before the switch 430 trips open to keep load 420b through load 420n connected to the main source 404.

All prior patents and publications referenced herein are incorporated by reference in their entireties.

Throughout the specification and claims, the following terms take the meanings explicitly associated herein, unless the context clearly dictates otherwise. The phrases "in one embodiment," "in an embodiment," and "in some embodiments" as used herein do not necessarily refer to the same embodiment(s), though it may. Furthermore, the phrases "in another embodiment" and "in some other embodiments" as used herein do not necessarily refer to a different embodiment, although it may. All embodiments of the disclosure are intended to be combinable without departing from the scope or spirit of the disclosure.

As used herein, the term "cycle" or "cycles" refers to turning on and/or off the switching device(s) (e.g., SSSDs) at a switch to connect/disconnect a power source to a load. In addition, the cycling of the switching device can be independent of the cycle of the input phase voltage of the power source connected to the load. For example, the switching device(s) can be cycled a plurality of times during a positive phase of the input phase voltage.

As used herein, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "between" does not necessarily require being disposed directly next to other elements. Generally, this term means a configuration where something is sandwiched by two or more other things. At the same time, the term "between" can describe something that is directly next to two opposing things. Accordingly, in any one or more of the embodiments disclosed herein, a particular structural component being disposed between two other structural elements can be:

disposed directly between both of the two other structural elements such that the particular structural component is in direct contact with both of the two other structural elements;

disposed directly next to only one of the two other structural elements such that the particular structural component is in direct contact with only one of the two other structural elements;

disposed indirectly next to only one of the two other structural elements such that the particular structural component is not in direct contact with only one of the two other structural elements, and there is another element which juxtaposes the particular structural component and the one of the two other structural elements;

disposed indirectly between both of the two other structural elements such that the particular structural component is not in direct contact with both of the two other structural elements, and other features can be disposed therebetween; or any combination(s) thereof.

As used herein "embedded" means that a first material is distributed throughout a second material.

Aspects

Various Aspects are described below. It is to be understood that any one or more of the features recited in the following Aspect(s) can be combined with any one or more other Aspect(s).

Aspect 1. A method comprising: obtaining, by a controller, an input from a first sensor measuring electrical characteristics at an electrical conductor connecting a main power source to a load using a transfer switch; comparing, by the controller, the input to one or more thresholds to determine an abnormal condition; cycling, by the controller, a first switch at the transfer switch between an OFF position and ON position for one or more cycles; determining, by the controller, whether the input from the first sensor exceeds the one or more thresholds when the first switch is in the ON position; and connecting, by the controller, the load to the main power source with the first switch in response to determining the input is within the one or more thresholds after the one or more cycles, or connecting the load to a second power source with a second switch in response to determining the input exceeds the one or more thresholds after the one or more cycles.

Aspect 2. The method according to aspect 1, wherein the input comprises: a source voltage.

Aspect 3. The method according to any of the preceding aspects, wherein the one or more thresholds comprises: an upper voltage threshold, a lower voltage threshold, and wherein the load is connected to the main power source when the source voltage is less than the upper voltage threshold and greater than the lower voltage threshold, wherein the load is connected to the second power source when the source voltage is greater than the upper voltage threshold or lower than the lower voltage threshold.

Aspect 4. The method according to any of the preceding aspects, wherein cycling the first switch at the transfer switch between the OFF position and the ON position for the one or more cycles further comprises: cycling, by the controller for each cycle, the first switch to the OFF position for a first period of time; and cycling, by the controller for each cycle, the first switch to the ON position for a second period of time and measuring the input to determine whether the input exceeds the one or more thresholds.

Aspect 5. The method according to any of the preceding aspects, wherein the first period of time and the second period of time each comprises approximately 0.1 msec.

Aspect 6. The method according to any of the preceding aspects, wherein connecting the load to the second power source further comprises: cycling, by the controller, the first switch to the OFF position to disconnect the load from the main power source; and cycling, by the controller, the second switch to the ON position to connect the load to the second power source.

Aspect 7. The method according to any of the preceding aspects, wherein the first switch comprises: one or more first solid-state switching devices (SSSDs), wherein the one or more first SSSDs is arranged in a reverse orientation to enable bi-directional flow of a phase current between the load and the main power source.

Aspect 8. The method according to aspect 7, wherein the one or more first SSSDs comprises at least one of: SiC metal-oxide-semiconductor field-effect transistors (MOSFETs), insulated gate bipolar transistors (IGBTs), bipolar junction transistors (BJTs), and junction-gate field effect transistors (JFETs).

Aspect 9. The method according to aspects 7 or 8, wherein the one or more first SSSDs comprises SiC MOSFETs.

Aspect 10. The method according to any of the preceding aspects, wherein the second switch comprises: one or more second SSSDs, wherein the one or more second SSSDs is arranged in a reverse orientation to enable bi-directional flow of a phase current between the load and the second power source.

Aspect 11. The method according to aspect 10, wherein the one or more second SSSDs comprises at least one of: SiC metal-oxide-semiconductor field-effect transistors (MOSFETs), insulated gate bipolar transistors (IGBTs), bipolar junction transistors (BJTs), junction-gate field effect transistors (JFETs), silicon controlled rectifiers (SCRs), and SCRs with paralleled resistive turn-off (RTO) circuits.

Aspect 12. The method according to aspects 10 or 11, wherein the one or more second SSSDs comprises SCRs with paralleled RTO circuits.

Aspect 13. A system comprising: a main power source; a second power source; a load; a transfer switch comprising:

a first switch located between the main power source and the load, and a second switch located between the second power source and the load; and a controller comprising: a processor, and a non-transitory computer-readable medium having stored thereon instructions executable by the processor to control an operation of the transfer switch including: obtain an input from a first sensor measuring electrical characteristics at an electrical conductor connecting the main power source to the load using the transfer switch, compare the input to one or more thresholds to determine an abnormal condition, cycle, for each cycle of one or more cycles, the first switch to an OFF position for a first period of time, cycle, for each cycle of the one or more cycles, the first switch to an ON position for a second period of time and measure the input to determine whether the input exceeds the one or more thresholds, determine whether the input from the first sensor exceeds the one or more thresholds when the first switch is in the ON position, and connecting, by the controller, the load to the main power source with the first switch in response to determining the input is within the one or more thresholds after the one or more cycles, or connecting the load to a second power source with a second switch in response to determining the input exceeds the one or more thresholds after the one or more cycles, wherein the first period of time and the second period of time each comprises approximately 0.1 msec.

Aspect 14. The system according to aspect 13, wherein the input comprises: a source voltage; wherein the one or more thresholds comprises: an upper voltage threshold, a lower voltage threshold, and wherein the load is connected to the main power source when the source voltage is less than the upper voltage threshold and greater than the lower voltage threshold, wherein the load is connected to the second power source when the source voltage is greater than the upper voltage threshold or lower than the lower voltage threshold.

Aspect 15. The system according to aspects 13 or 14, wherein connecting the load to the second power source further comprises: cycling, by the controller, the first switch to the OFF position to disconnect the load from the main power source; and cycling, by the controller, the second switch to the ON position to connect the load to the second power source.

Aspect 16. The system according to aspects 13, 14, or 15, wherein the first switch comprises one or more first solid-state switching devices (SSSDs) comprising at least one of: SiC metal-oxide-semiconductor field-effect transistors (MOSFETs), insulated gate bipolar transistors (IGBTs), bipolar junction transistors (BJTs), and junction-gate field effect transistors (JFETs), wherein the one or more first SSSDs is arranged in a reverse orientation to enable bi-directional flow of a phase current between the load and the main power source.

Aspect 17. The system according to aspect 16, wherein the one or more first SSSDs comprises SiC MOSFETs.

Aspect 18. The system according to aspects 13, 14, 15, 16, or 17, wherein the second switch comprises one or more second SSSDs comprising at least one of: SiC metal-oxide-semiconductor field-effect transistors (MOSFETs), insulated gate bipolar transistors (IGBTs), bipolar junction transistors (BJTs), junction-gate field effect transistors (JFETs), silicon controlled rectifiers (SCRs), and SCRs with paralleled resistive turn-off (RTO) circuits, wherein the one or more second SSSDs is arranged in a reverse orientation to enable bi-directional flow of a phase current between the load and the second power source.

Aspect 19. The system according to aspect 18, wherein the one or more second SSSDs comprises SCRs with paralleled RTO circuits.

Aspect 20. A transfer switch device comprising: a first switch located between a main power source and a load and comprising: one or more first solid-state switching devices (SSSDs), wherein each first SSSD comprises at least one of SiC metal-oxide-semiconductor field-effect transistors (MOSFETs), insulated gate bipolar transistors (IGBTs), bipolar junction transistors (BJTs), and junction-gate field effect transistors (JFETs), a second switch located between a second power source and the load and comprising: one or more second SSSDs, wherein each second SSSD comprises at least one of SiC metal-oxide-semiconductor field-effect transistors (MOSFETs), insulated gate bipolar transistors (IGBTs), bipolar junction transistors (BJTs), junction-gate field effect transistors (JFETs), silicon controlled rectifiers (SCRs), and SCRs with paralleled resistive turn-off (RTO) circuits; and a controller including a processor and a non-transitory computer-readable medium having stored thereon instructions executable by the processor to perform operations including: obtain a source voltage from a first sensor measuring electrical characteristics at an electrical conductor connecting the main power source to the load using the transfer switch, compare the source voltage to an upper voltage threshold and a lower voltage threshold to determine an abnormal condition, cycle, for each cycle of one or more cycles, the first switch to an OFF position for a first period of time, cycle, for each cycle of the one or more cycles, the first switch to an ON position for a second period of time and measure the source voltage to determine whether the source voltage exceeds the upper voltage threshold and the lower voltage threshold, determine whether the source voltage from the first sensor exceeds the upper voltage threshold or the lower voltage threshold when the first switch is in the ON position, and connecting, by the controller, the load to the main power source with the first switch in response to determining the source voltage is less than the upper voltage threshold and greater than the lower voltage threshold after the one or more cycles, or connecting the load to a second power source with a second switch in response to determining the source voltage is greater than the upper voltage threshold or less than the lower voltage threshold after the one or more cycles, wherein the first period of time and the second period of time each comprises approximately 0.1 msec.

It is to be understood that changes may be made in detail, especially in matters of the construction materials employed and the shape, size, and arrangement of parts without departing from the scope of the present disclosure. This Specification and the embodiments described are examples, with the true scope and spirit of the disclosure being indicated by the claims that follow.

What is claimed is:

1. A method comprising:
   obtaining, by a controller, an input representative of electrical characteristics at an electrical conductor connecting a main power source to a load using a transfer switch;
   comparing, by the controller, the electrical characteristics from the input to one or more thresholds to determine an abnormal condition;
   cycling, by the controller, a first switch at the transfer switch between an OFF position and ON position for one or more cycles;
   determining, by the controller, whether the electrical characteristics at the electrical conductor from the input exceeds the one or more thresholds when the first switch is in the ON position; and
   connecting, by the controller, the load to the main power source with the first switch in response to determining the input is within the one or more thresholds after the one or more cycles, or connecting the load to a second power source with a second switch in response to determining the input exceeds the one or more thresholds after the one or more cycles,
   wherein the input comprises a source voltage, and wherein the one or more thresholds comprises:
      an upper voltage threshold,
      a lower voltage threshold, and
      wherein the load is connected to the main power source when the source voltage is less than the upper voltage threshold and greater than the lower voltage threshold,
      wherein the load is connected to the second power source when the source voltage is greater than the upper voltage threshold or lower than the lower voltage threshold.

2. The method according to claim 1, wherein cycling the first switch at the transfer switch between the OFF position and the ON position for the one or more cycles further comprises:
   cycling, by the controller for each cycle, the first switch to the OFF position for a first period of time; and
   cycling, by the controller for each cycle, the first switch to the ON position for a second period of time and measuring the input to determine whether the input exceeds the one or more thresholds.

3. The method according to claim 2, wherein the first period of time and the second period of time each comprises approximately 0.1 msec.

4. The method according to claim 1, wherein connecting the load to the second power source further comprises:
   cycling, by the controller, the first switch to the OFF position to disconnect the load from the main power source; and
   cycling, by the controller, the second switch to the ON position to connect the load to the second power source.

5. The method according to claim 1, wherein the first switch comprises:
   one or more first solid-state switching devices (SSSDs),
   wherein the one or more first SSSDs is arranged in a reverse orientation to enable bi-directional flow of a phase current between the load and the main power source.

6. The method according to claim 1, wherein the second switch comprises:
   one or more second SSSDs,
   wherein the one or more second SSSDs is arranged in a reverse orientation to enable bi-directional flow of a phase current between the load and the second power source.

7. A system comprising:
   a main power source;
   a second power source;
   a load;
   a transfer switch comprising:
      a first switch located between the main power source and the load, and
      a second switch located between the second power source and the load; and
   a controller comprising:
      a processor, and a non-transitory computer-readable medium having stored thereon instructions executable by the processor to control an operation of the transfer switch including:

obtain an input representative of electrical characteristics measured at an electrical conductor connecting the main power source to the load using the transfer switch, compare the input to one or more thresholds to determine an abnormal condition, cycle, for each cycle of one or more cycles, the first switch to an OFF position for a first period of time, cycle, for each cycle of the one or more cycles, the first switch to an ON position for a second period of time and measure the input to determine whether the input exceeds the one or more thresholds, determine whether the measured electrical characteristics from the input exceeds the one or more thresholds when the first switch is in the ON position, and connecting, by the controller, the load to the main power source with the first switch in response to determining the input is within the one or more thresholds after the one or more cycles, or connecting the load to a second power source with a second switch in response to determining the input exceeds the one or more thresholds after the one or more cycles, wherein the first period of time and the second period of time each comprises approximately 0.1 msec.

8. The system according to claim 7, wherein the input comprises:

a source voltage;

wherein the one or more thresholds comprises:

an upper voltage threshold, a lower voltage threshold, and wherein the load is connected to the main power source when the source voltage is less than the upper voltage threshold and greater than the lower voltage threshold, wherein the load is connected to the second power source when the source voltage is greater than the upper voltage threshold or lower than the lower voltage threshold.

9. The system according to claim 7, wherein connecting the load to the second power source further comprises:

cycling, by the controller, the first switch to the OFF position to disconnect the load from the main power source; and cycling, by the controller, the second switch to the ON position to connect the load to the second power source.

10. The system according to claim 7, wherein the first switch comprises one or more first solid-state switching devices (SSSDs), wherein the one or more first SSSDs is arranged in a reverse orientation to enable bi-directional flow of a phase current between the load and the main power source.

11. The system according to claim 7, wherein the second switch comprises one or more second SSSDs, wherein the one or more second SSSDs is arranged in a reverse orientation to enable bi-directional flow of a phase current between the load and the second power source.

12. A transfer switch device comprising:

a first switch located between a main power source and a load and comprising:

one or more first solid-state switching devices (SSSDs), a second switch located between a second power source and the load and comprising:

one or more second SSSDs; and a controller including a processor and a non-transitory computer-readable medium having stored thereon instructions executable by the processor to perform operations including:

obtain a source voltage from an input representative of electrical characteristics measured at an electrical conductor connecting the main power source to the load using the transfer switch, compare the source voltage to an upper voltage threshold and a lower voltage threshold to determine an abnormal condition, cycle, for each cycle of one or more cycles, the first switch to an OFF position for a first period of time, cycle, for each cycle of the one or more cycles, the first switch to an ON position for a second period of time and measure the source voltage to determine whether the source voltage exceeds the upper voltage threshold and the lower voltage threshold, determine whether the source voltage exceeds the upper voltage threshold or the lower voltage threshold when the first switch is in the ON position, and connecting, by the controller, the load to the main power source with the first switch in response to determining the source voltage is less than the upper voltage threshold and greater than the lower voltage threshold after the one or more cycles, or connecting the load to the second power source with the second switch in response to determining the source voltage is greater than the upper voltage threshold or less than the lower voltage threshold after the one or more cycles, wherein the first period of time and the second period of time each comprises approximately 0.1 msec.

* * * * *